United States Patent
Yan (10) Patent No.: US 8,763,938 B2
(45) Date of Patent: Jul. 1, 2014

(54) METHOD AND SYSTEM FOR PREPARING DENSIFIED LIGNOCELLULOSIC PULP FOR USE IN THERMOPLASTIC COMPOSITE MANUFACTURING PROCESSES

(76) Inventor: Vincent Yan, Toronto (CA)

( * ) Notice: Subject to any disclaimer, the term of this patent is extended or adjusted under 35 U.S.C. 154(b) by 294 days.

(21) Appl. No.: 12/863,316

(22) PCT Filed: Jan. 16, 2009

(86) PCT No.: PCT/CA2009/000043
§ 371 (c)(1),
(2), (4) Date: Mar. 27, 2013

(87) PCT Pub. No.: WO2010/078640
PCT Pub. Date: Jul. 15, 2010

(65) Prior Publication Data
US 2011/0105650 A1    May 5, 2011

Related U.S. Application Data (60) Provisional application No. 61/021,800, filed on Jan. 17, 2008.

(51) Int. Cl.
*B02C 19/00* (2006.01)

(52) U.S. Cl.
USPC .......................... 241/24.29; 241/28

(58) Field of Classification Search
USPC ................ 241/28, 24.29; 162/28, 261
See application file for complete search history.

(56) References Cited

U.S. PATENT DOCUMENTS

| | | |
|---|---|---|
| 3,883,081 A | 5/1975 | Dahl et al. |
| 4,146,183 A | 3/1979 | Nikkel |
| 4,381,082 A | 4/1983 | Elliott et al. |
| 4,919,345 A | 4/1990 | Burlington et al. |
| 5,087,518 A | 2/1992 | Shimada |
| 6,743,507 B2 | 6/2004 | Barlow et al. |
| 6,773,545 B2 | 8/2004 | Tanner et al. |
| 6,811,879 B2 | 11/2004 | Dezutter et al. |
| 6,837,452 B2 | 1/2005 | Dezutter et al. |
| 6,883,399 B2 | 4/2005 | Burstall |
| 7,201,825 B2 | 4/2007 | Dezutter et al. |
| 7,306,846 B2 | 12/2007 | Dezutter et al. |
| 2006/0113695 A1 | 6/2006 | De Maria et al. |

FOREIGN PATENT DOCUMENTS

| | | | |
|---|---|---|---|
| CA | 2527325 | | 5/2007 |
| WO | WO 2007/005689 | | 1/2007 |
| WO | WO 2007/056839 | * | 5/2007 |

* cited by examiner

*Primary Examiner* — Mark Rosenbaum
(74) *Attorney, Agent, or Firm* — Lorelei Graham (57) ABSTRACT

A method of preparing lignocellulosic fiber aggregates from a densified mass of lignocellulosic fiber, such as densified bales, for use in manufacturing high performance, recyclable and moldable lignocellulosic fiber and thermoplastic composites, or articles made of the high performance, recyclable and moldable lignocellulosic fiber and thermoplastic composites is provided. The method includes: (a) feeding densified forms of lignocellulosic fiber into a size reduction device; and size reducing the lignocellulosic fibers so as to produce dense lignocellulosic fiber aggregates having an average size profile suitable for use in manufacturing high performance, recyclable and moldable lignocellulosic fiber and thermoplastic composites, or articles made of the high performance, recyclable and moldable lignocellulosic fiber and thermoplastic composites. The density of the lignocellulosic fiber is generally maintained throughout the method. A system for preparing lignocellulosic fiber in accordance with the method is also provided.

26 Claims, 4 Drawing Sheets

METHOD AND SYSTEM FOR PREPARING DENSIFIED LIGNOCELLULOSIC PULP FOR USE IN THERMOPLASTIC COMPOSITE MANUFACTURING PROCESSES

FIELD OF THE INVENTION

The present invention relates generally to the field of lignocellulosic/thermoplastic composite materials. The present invention more particularly relates to the field of processing, metering, and feeding densified lignocellulosic pulp into thermoplastic composite manufacturing processes.

BACKGROUND OF THE INVENTION

Lignocellulosic/thermoplastic composites are materials that combine thermoplastic polymers with lignocellulosic materials, which are used as either reinforcements or fillers. The advantages of such composites are well documented in prior art such as in Canadian Patent Application No. 2,527,325 (Sain et al.).

There are numerous sources of lignocellulosic materials that may be used as thermoplastic composite fillers or reinforcements. Such sources may include both wood and non-wood based materials. Non-wood based materials may include bast and leaf fibres taken from agricultural crop such as hemp, flax, wheat, and sisal.

There are also various mechanically or chemically processed forms of supplying such lignocellulosic materials depending on the source. Such forms include: powders or particulates including wood flour and sawdust, chopped fibres or strands, continuous rovings, woven and non-woven mats, and pulp.

Pulp fibres are generally a product of lignocellulosic materials that have been processed through a combination of chemical and/or mechanical pulping processes. Such processes including Kraft and Mechanical pulping are well known within the pulp and paper industry. Although lignocellulosic pulp can be produced from agricultural fibre sources, by far the largest source of pulp in the world is wood for use in papermaking, paperboard, and absorbent products applications.

Most lignocellulosic pulps are densified and packaged into a baled form, which represents a low-cost method of storing and transporting such raw materials. More specifically, bales of commercially available wood pulp represent a large and relatively reliable supply of lignocellulosic fibres for use in thermoplastic composites applications.

There are numerous conventional processes that are used to combine lignocellulosic materials with thermoplastics, most of which are well known to those skilled in the art of plastics processing. Such processes include extrusion, compounding, compression molding, injection molding, and combinations or variations thereof.

To date, the majority of conventional and commercially available lignocellulosic-thermoplastic composites use lignocellulosic materials that are supplied in the form of powders such as wood flour. As such, feeding difficulties into such manufacturing processes are reduced, as powders are better flowing than fibrous materials. The other major category of conventional lignocellulosic/thermoplastic composite materials includes compression-molded parts, however in this case feeding issues are diminished as the fibres are typically placed into an open mold and are supplied in various forms of mats.

The feeding of fibrous materials into plastics molding or compounding machines such as extruders are well-known challenges in the thermoplastic composites field. If the bulk density of the material is too low, or if the fibre lengths are too long, "bridging" occurs. "Bridging" refers to a case where the material does not flow, and is in effect clogging transition points in the process, such as at the feed throat of an extruder.

In the fields of both glass and lignocellulosic fibre reinforced thermoplastics, numerous approaches have been used to solve problems of feeding and bridging. Many solutions to feeding fibrous materials are also linked with other technical requirements, including mechanical performance.

An increased fibre length is often desired in thermoplastic composite applications to maximize mechanical properties. However, the flowability of fibrous materials decreases with increasing fibre lengths. One solution to this problem is to change the nature of the process and provide fibrous material in the form of yarns or continuous rovings. In this case the rovings are "pulltruded" and subsequently cut and mixed through an extruder. The disadvantage of such a process is that producing rovings or yarns increases the raw material costs.

Barlow et al. in U.S. Pat. No. 6,743,507 (2004) describe a process in which lignocellulosic pulp is first converted into a densified pellet using a water-soluble binder for ease of feeding. It requires that the fibres in sheet form be first broken into discrete bundles, which in turn are pelletized with the binder. The addition of both these steps and the use of binding chemicals would add cost to the process. Another embodiment of the invention involves capturing and pelletizing the pulp at the mill before it is formed into sheets. This embodiment does not allow for the use of commercially available market pulp.

Dezutter et al. in U.S. Pat. No. 6,811,879 disclose a new form of flake pulp having a specific size, density and wet dispersibility, that may be metered in specified quantities when adding to cementitious products due to the fact that bulk quantities of the flakes flow well in conduits and other enclosed containers. Dezutter et al. in U.S. Pat. No. 6,837,452 further discloses a process for dewatering liquid pulp stock to produce singulated pulp flakes. Such flakes may be sent to a baler for packaging.

Dezutter and Hansen in U.S. Pat. Nos. 7,201,825 and 7,306,846 disclose a process for making discrete particles of cellulosic material that are flowable and meterable. Such particles comprise singulated cellulose fibres that have been densified.

Process aids may be added to assist in the flow of fibrous materials. Khavkine et al. in U.S. Pat. No. 6,883,399 (2004) incorporate a blend of flax bast fibres and shives for improved flowability. Shimada et al. in U.S. Pat. No. 5,087,518 (1992) combine a mixture of glass flakes and fibres to provide for a free-flowing reinforcing material in thermoplastic resins.

Despite the numerous sources and forms of lignocellulosic materials available, and the existing techniques of feeding fibrous materials, there is a need for a process capable of supplying densified lignocellulosic pulps into a variety of thermoplastic composite manufacturing processes. The process should meet the particular requirements of such composite manufacturing processes including supplying pulp without any feeding difficulties, and should enable precise control of the feed rates.

The present invention meets the aforementioned requirements and is capable of delivering lignocellulosic pulp into composite manufacturing processes without any bridging effect. It allows for the use of conventional market pulp, is readily scalable, and is capable of integrating directly into any thermoplastics composite manufacturing process, whether operating in continuous or batch modes.

SUMMARY OF THE INVENTION

In one aspect, the present disclosure relates to a method of preparing dense lignocellulosic fibre aggregates for use in manufacturing high performance, recyclable and moldable lignocellulosic fibre and thermoplastic composites, or articles made of the high performance, recyclable and moldable lignocellulosic fibre and thermoplastic composites, characterized in that it comprises the steps of: feeding a densified form of lignocellulosic fibre into a size reduction device; and size reducing the densified form of lignocellulosic fibre so as to produce dense lignocellulosic fibre aggregates having an average size profile suitable for use in manufacturing high performance, recyclable and moldable lignocellulosic fibre and thermoplastic composites, or articles made of the high performance, recyclable and moldable lignocellulosic fibre and thermoplastic composites.

In another aspect, the present disclosure relates to a system for preparing dense lignocellulosic fibre aggregates for use in manufacturing high performance, recyclable and moldable lignocellulosic fibre and thermoplastic composites, or articles made of the high performance, recyclable and moldable lignocellulosic fibre and thermoplastic composites, characterized in that it comprises: a size reduction apparatus operable to size reduce a densified form of lignocellulosic fibre so as to produce the dense lignocellulosic fibre aggregates having an average size profile suitable for use in manufacturing high performance, recyclable and moldable lignocellulosic fibre and thermoplastic composites, or articles made of the high performance, recyclable and moldable lignocellulosic fibre and thermoplastic composites.

BRIEF DESCRIPTION OF THE DRAWINGS

A detailed description of the preferred embodiment(s) is (are) provided herein below by way of example only and with reference to the following drawings, in which.

In the drawings, one embodiment of the invention is illustrated by way of example. It is to be expressly understood that the description and drawings are only for the purpose of illustration and as an aid to understanding, and are not intended as a definition of the 20 limits of the invention.

DETAILED DESCRIPTION OF THE INVENTION

The present invention is a method and system for producing dense fibre aggregates from a densified mass of lignocellulosic fibre, for example, a densified bale. As a skilled reader will recognize, the present invention may utilize densified forms of lignocellulosic fibre other than baled pulp. It should also be understood that a "bale" in this disclosure refers to a densified mass regardless of shape, dimension, or method of forming the bale. Dense fibre aggregates are produced by way of a dense fibre aggregate production device whereby aggregates of pulp are produced through gentle size-reduction of the lignocellulosic fibre. This removal occurs without any significant "defiberization effect" or reduction in density of the pulp. Also, the dense fibre aggregate production device is disposed to remove fibre aggregates with minimal shearing action on the individual fibres, thereby preserving fibre length.

The densified fibre of the present invention may be produced to provide particular benefits for feeding into thermoplastic composite manufacturing processes, when for example, using loss-in-weight feed systems: (a) it provides relatively narrow particle size distribution; and (b) exhibits reduced "bridging" at feeding and transition points during the composite manufacturing process. Such properties are also beneficial for feeding into processes following size reduction and preceding thermoplastic composite manufacturing processes ("intervening processes").

In another aspect of the invention, the density of the fibre is substantially maintained during any intervening processes. Accordingly, the densified fibre yielded by the method and system of the present invention may be stored, conveyed or fed through systems and processes prior to any composite manufacturing process. The density of the lignocellulosic fibres is maintained throughout the method and process whereby the dense fibre aggregates can provide individual particle densities approximately equal to, or substantially the same as, the density of the lignocellulosic fibre in the originally supplied densified form A first aspect of the present invention involves a method of preparing densified lignocellulosic fibre aggregates from lignocellulosic fibre which includes obtaining the densified mass of lignocellulosic fibre by means of a process for forming the densified mass of lignocellulosic fibre. A second aspect of the present invention, involves a method of preparing densified lignocellulosic fibre aggregates from lignocellulosic fibre obtained in a densified bale form.

The use of baled lignocellulosic pulp in thermoplastic composites is an unconventional application in an industry that is designed to service papermaking and absorbent products manufacturers. The two key issues to be addressed when using baled lignocellulosic pulp for composites applications are the conversion of the pulp bales into a suitable form that can be subsequently fed into any conventional thermoplastic composites manufacturing process, and the precise feeding of such pulp into the manufacturing process. The overall method is illustrated having regard to FIG. 1.

Because papermaking is the primary application of pulp bales, there is typically no need for dry processing as the entire bale is thrown into a tank of water or "hydra-pulper". Thermoplastic composite manufacturing processes on the other hand, require pulp with low moisture content. As such, for composites manufacturing the advantage of using water to break apart or dissolve the bales is lost.

For absorbent product applications, the pulp bales are typically processed dry. The difference is that a low bulk density "defiberized" form of the pulp is required, which in thermoplastic composite applications would cause the bridging effect during feeding.

For the purposes of this invention, "lignocellulosic pulp" is defined as any lignocellulosic fibrous material that has been manufactured using either chemical or mechanical pulping processes or combinations of both. Such processes include: the Kraft process, Sulphite processes, or the family of High-Yield pulping processes. Some examples of High-Yield pulping processes include: Thermomechanical pulps (TMP), Chemithermomechanical pulp (CTMP), and Bleached Chemithermomechanical pulps (BCTMP). The pulp can be from both wood and non-wood sources such as agricultural fibres as well as both virgin and recycled fibres. It should be noted that while lignocellulosic fibres in pulp form are preferred in the present invention, other forms of lignocellulosic fibres such as those exposed to enzymatic treatments may also be processed.

The bale density referred to in this embodiment should usually define the theoretical maximum density of material eventually fed into the downstream thermoplastic composites manufacturing process. This bale density may be controlled during sheet forming or compression of the bales, depending on the pulping process.

Figure 2:
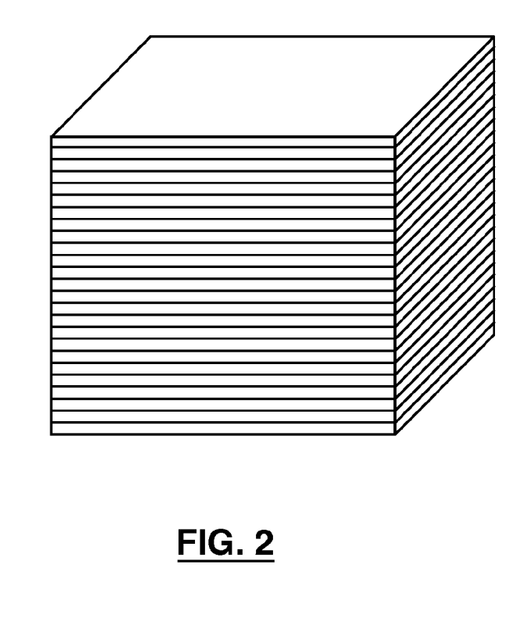
FIG. 2 illustrates a typical Bleached Kraft pulp bale.
Figure 3:
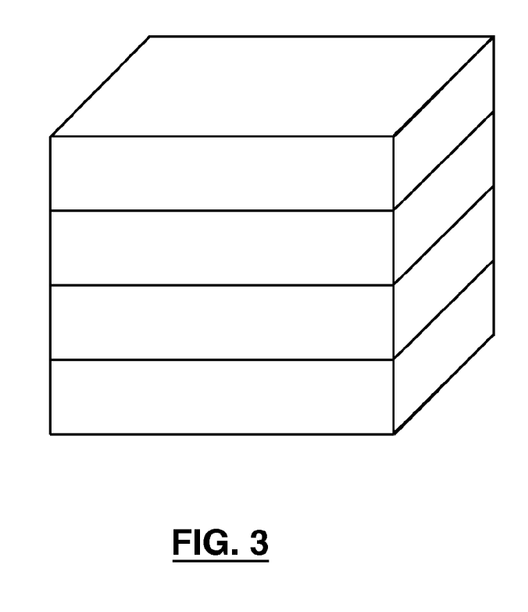
FIG. 3 illustrates a typical flash dried High-Yield pulp bale.

The largest source of lignocellulosic pulp is from commercially available wood pulps such as Bleached Kraft pulps or High-Yield pulps. Commercially available Bleached Kraft pulp bales typically consist of individual sheets of pulp that have been dried and stacked to form a complete bale as depicted in FIG. 2, whereas High Yield pulp bales typically consist of a homogenous mass of pulp that has been flash dried and pressed in molds into individual blocks or "cookies". The "cookies" are then typically stacked four-high to form a complete bale as depicted in FIG. 3. Kraft pulp bales typically weigh 500-600 lbs with densities between 0.8-1.1 $g/cm^3$, while flash-dried bales of Chemithermomechanical pulp weigh between 300-500 lbs and have densities between 0.5-0.9 $g/cm^3$. Both types of bales are shipped "dry", meaning approximate bone-dry moisture content of between 10-16%.

When provided with lignocellulosic pulp bales, there have been prior art methods have attempted to size-reduce such bales for other applications such as sanitary napkins and diaper manufacturing. Examples of such methods may include cutting or splitting the bale into sheets or slabs, as well as exposing the bale to various forms of high-impact or high-speed milling or grinding, such as hammermills. Such processes however, do not produce forms of the pulp that are suitable for thermoplastic composites manufacturing processes.

When exposing the bales to various forms of high-impact or high-speed grinding, the bulk density of the pulp is drastically reduced, and large amounts of dust are produced. Pulp converted through such processes is extremely difficult to feed due to its low bulk density form.

The present invention uses an alternative strategy for converting lignocellulosic pulp bales into a form suitable for feeding. Instead of using the previously described techniques, the present invention is capable of directly converting the bales through the production of "Dense Fibre Aggregates" from the bale surfaces. This is done without any prior modifications or processing conducted on the bale. Such dense fibre aggregates are suitable for controlled feeding into a variety of thermoplastic composite manufacturing processes. The present invention also maximizes retention of fibre length and minimizes production of dust.

Dense fibre aggregates are defined as particles of approximately 0.2-3.0 inch in width, more preferably 0.5-1.0 inch in width, and with individual aggregate densities that are close to the pre-converted density of the pulp bale. Such aggregates may be in a variety of shapes such as oval, rectangular, cubic, or discs. In the case of oval or circular shaped aggregates "width" is defined as the diameter, while for irregular or rectangular shaped aggregates, "width" is defined as the longer of the two cross sectional dimensions. Depending on the pulp source and type of bale, the aggregates may also have varying thickness. For example, when taken from Kraft pulp the aggregates would have a lower thickness (flake form) than from flash-dried high-yield pulp bales.

Typically the individual aggregate densities will be higher than the bulk density, as the latter is determined by how the individual aggregates pack together, and a densified bale represents approximately the highest packing density. The dense fibre aggregate bulk densities are typically between 0.1-0.8 $g/cm^3$. Preferably, densities of the individual aggregates are equal to the original bale density. The dense fibre aggregates produced by the present invention may have a narrow particle size distribution, and may not experience "bridging" at feeding and transition points during the process so long as their density is approximately maintained. Due to their narrow size distribution, controlled and even feed rates may be achieved.

Figure 1:
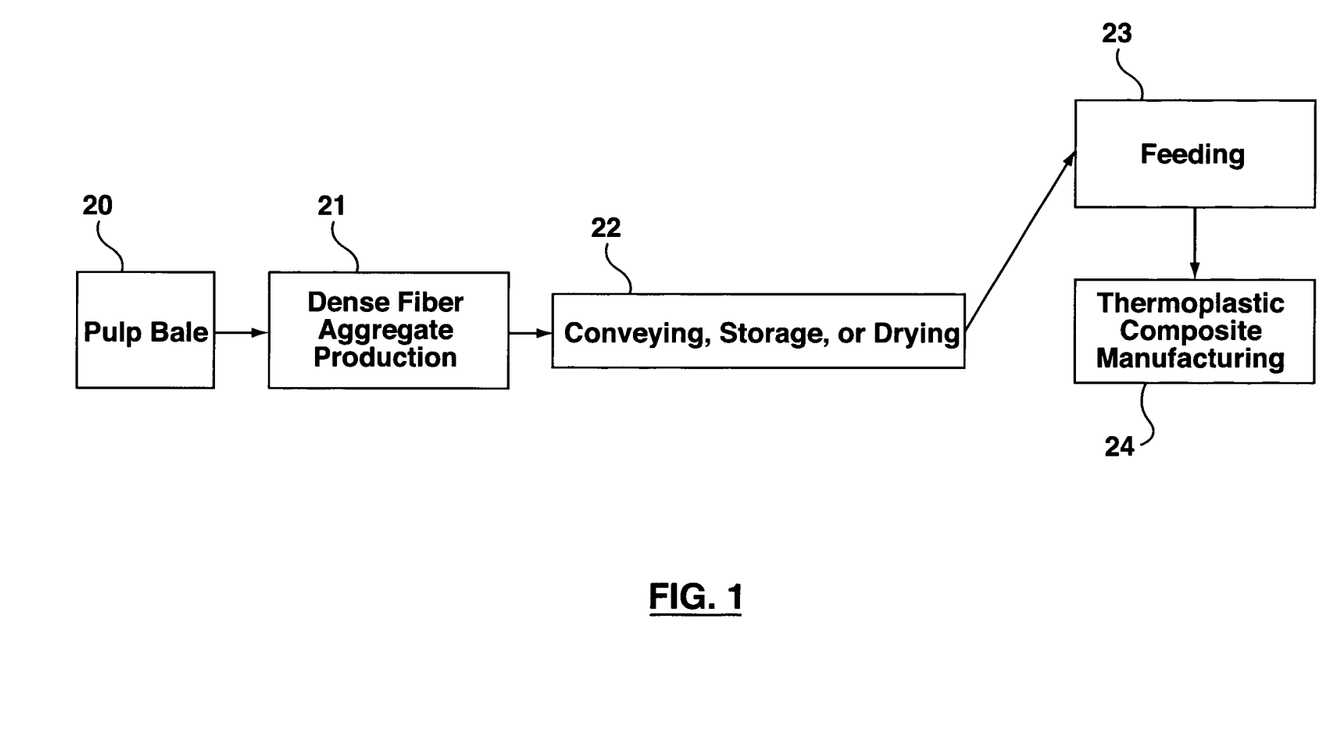
FIG. 1 illustrates a block process diagram of one embodiment of the present invention.

FIG. 1 illustrates a block diagram of one particular embodiment of the present invention. A lignocellulosic pulp bale 20 is fed into a dense fibre aggregate production device 21. The bale may be fed using any standard conveying means, such as a belt conveyor. In one embodiment of the present invention, the dense fibre aggregate production device is a machine equipped with one or more shafts or "rotors" rotating at a "low-speed", where each rotor has a series of cutters or protrusions. The bale is pressed against the low-speed rotors in order to produce the dense fibre aggregates. By operating the rotors at low-speed, the dense aggregates of pulp may be gently removed directly from the bale surface by the cutters without any significant "defiberization effect" or reduction in density of the pulp. The cutters remove fibre aggregates from the surface of the bale without imposing any severe shearing action on the individual fibres, therefore fibre length may also be well preserved.

Figure 4:
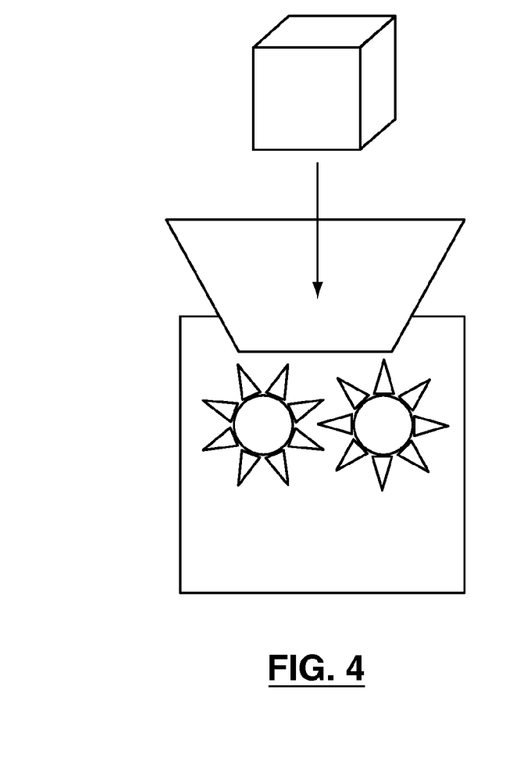
FIG. 4 illustrates an example low-speed high-torque system with vertical feed.
Figure 5:
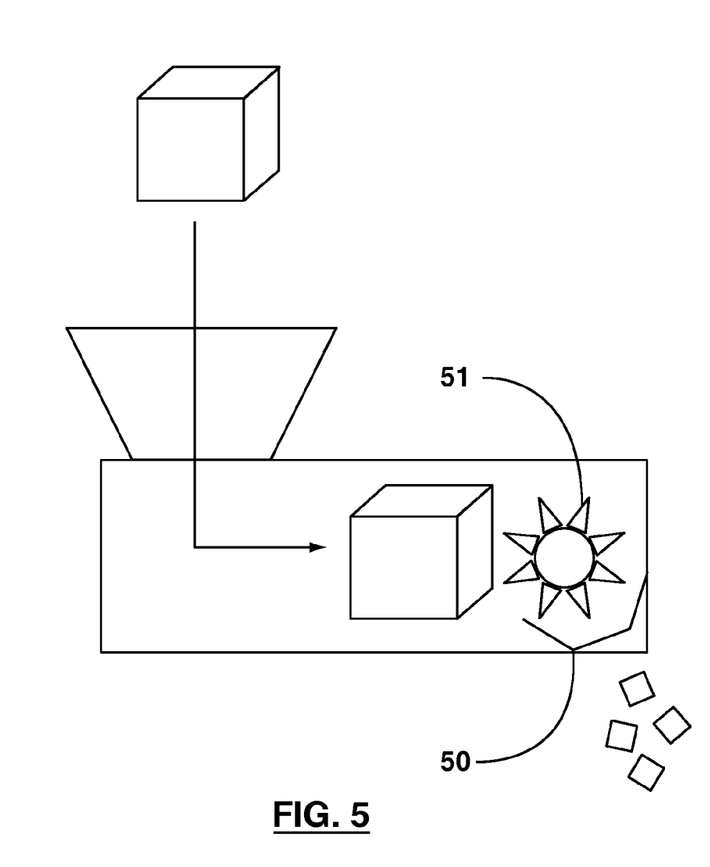
FIG. 5 illustrates an example low-speed high-torque system with horizontal feed.

One example of such a dense fibre aggregate production device is a low-speed high-torque shredder FIG. 4 and FIG. 5 equipped with a screen 50 and with one or more rotors 51, each rotor comprising protrusions, blades or cutters at defined spacings. Such shredders are commercially available from companies such as SSI Shredding Systems. Devices of this type may operate either vertically or horizontally, meaning that the bale is placed on top of the rotors in the vertical case FIG. 4, or the bale is pressed horizontally against the rotors FIG. 5.

It is important to note that while there are numerous size-reduction devices that operate on the principle of cutting or shearing rotors, the discussed embodiment of the present invention requires operation at low-speed and high-torque. "Low-speed" refers to machines operating at rotations per minute (RPM) preferably below 150 RPM, more preferably below 90 RPM, although RPM settings chosen and actual results may depend on other factors such as the dimensions of the cutters and diameter of the rotor. In general, low-speed high-torque operation differs from size reduction processes that appear to be similar such as granulators or hammer mills, which operate at or above several hundred RPM. Due to the lower RPM at operation, an increased torque must be maintained when compared to typical granulators in order to extract the dense aggregates.

The differences when operating at low-speed and high-torque compared to similarly configured devices operating at a higher RPM are apparent when examining the converted product, as the density of the pulp is well preserved when the RPM is maintained at a low level and the dense aggregates are produced. Increasing RPM will lead to a drastic decrease in bulk density, and instead of dense aggregates a fluffy form of the pulp is produced. For example, a typical pulp bale at bale density of 0.6 $g/cm^3$ may be reduced to a bulk density of 0.02 $g/cm^3$ if processed at RPMs over 150. Such low densities cause severe bridging and feeding difficulties. Increasing RPM also leads to an increased production of dust.

Depending on the scale of the compounding or molding process 24, a variety of mass throughputs at dense fibre aggregate production 21 may be required. In addition, pulp bales may be supplied in a variety of dimensions. The number and configuration of the rotors may affect both the throughput and bale handling capability of the aggregate production system. For example a four-rotor system may be capable of handling larger bales, and/or have higher throughput than a single rotor system. The size and number of rotors of the aggregate production system however, are simply a function of scale and not necessarily a primary element of the principle of the present invention.

The combination of process variables such as: pulp bale type, starting bale density, screen size/shape, and cutter shape/spacings will define the final size and shape of the dense fibre aggregates, which is matched to the throughput and size of the feeding step 23 as well as the resulting composite manufacturing process being fed 24. A narrow and controllable aggregate size distribution is maintained through the adjustment of such variables.

In order to maintain sufficient pressure of the bale against the rotors for dense fibre aggregate production to occur, it is desirable to use either the weight of additional bales which are fed continuously on top of the current bale being processed, or to use a device such as a "ram" to maintain pressure as the weight of the bale decreases while the aggregates are being produced. A ram is a device that applies pressure onto the bale against the rotor, and is often powered through a hydraulic system. Such a device may apply pressure downward in the case of a vertically fed size reduction system, as shown in FIG. 4, or horizontally in the case of a horizontal system, as shown in FIG. 5. If sufficient pressure is not maintained, the bale may "float" on top of the rotors and production of dense fibre aggregates may not occur.

Following the production of dense fibre aggregates, it is important that the density of the aggregates be substantially maintained up to the point of entry into the composite manufacturing process 24. Drastic reduction in density may lead to bridging problems at subsequent feeding or handling steps. The dense fibre aggregates are conveyed 22 either to temporary storage, or directly to a feeding system 23. Optionally, the dense fibre aggregates may also be conveyed to a dryer for moisture content reduction before further feeding into the composites manufacturing process. If the dense fibre aggregates are temporarily stored or dried before feeding, a secondary feeding and conveying system operating on similar constraints discussed should be used.

Thus any number of systems and related processes including storage, conveying, or feeding, occurring in between the steps of size reduction 21 and the composites manufacturing process 24 should be provided such that there is minimal reduction in pulp density.

The final step of the present invention involves feeding 23 the dense fibre aggregates into typical equipment used in thermoplastic composite manufacturing processes 24. Such processes may include extrusion (for example single or twin-screw extrusion), compounding, injection molding, or combinations thereof, such as in-line compounding and injection molding systems. Typically, equipment used in such manufacturing processes have feed throats with associated hoppers mounted on top. The aggregates are fed into the hopper and are discharged by gravity downwards into a rotating screw. In order for the aggregates to properly flow from the hopper into a screw, the density must again be maintained during the feeding step 23 to prevent "bridging" at the throat of the equipment used for composite manufacturing. The feeding step must also allow for precise control of feed rates in order to determine the exact mass flow rate of aggregates being fed either in continuous or batch processing.

In one embodiment of the present invention, the dense fibre aggregates are fed using at least one rotating screw, more preferably a spiral screw, however any screw that does not cause reduction in density of the aggregates may be used. The screw is typically mounted within a tube of approximately the same length. A spiral screw is preferred because its open spiral design allows aggregates to be conveyed without much reduction in density and the aggregates will not "pack" within the flights of the screws. In addition, depending on the composites manufacturing process, multiple feed screws may also be used.

Figure 6:
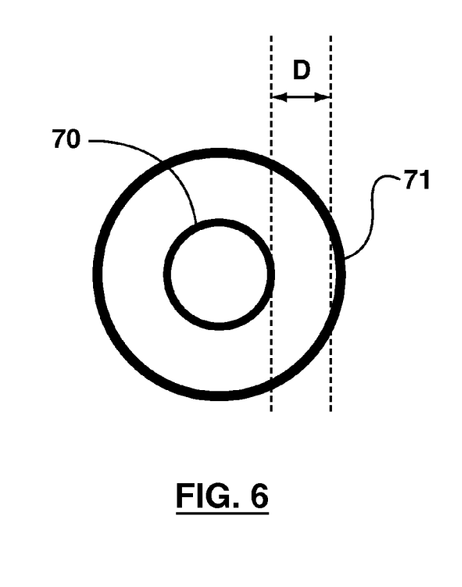
FIG. 6 illustrates a cross sectional view of a screw within a tube

FIG. 6 depicts a cross section of a screw 70 within a tube 71. It is important to note that the distance "D" between the screw outer diameter edge and the inner wall of the tube must be selected to prevent any shearing of the aggregates between the screw and the tube wall which could cause a lowering of the aggregate bulk density, and subsequent bridging of the aggregates. If the distance "D" is too small, the aggregates will be defiberized, yet if the distance "D" is too large, improper filling of the screw will occur and the material will not feed or feed rates will be lowered. Thus, a spiral screw sized correctly in relation to the tube inner diameter may be capable of conveying the dense aggregates without causing any bridging effect. The optimal distance "D" depends on the size of the aggregates being fed, however it is approximately equal to the maximum diameter or length of the aggregates.

Figure 7:
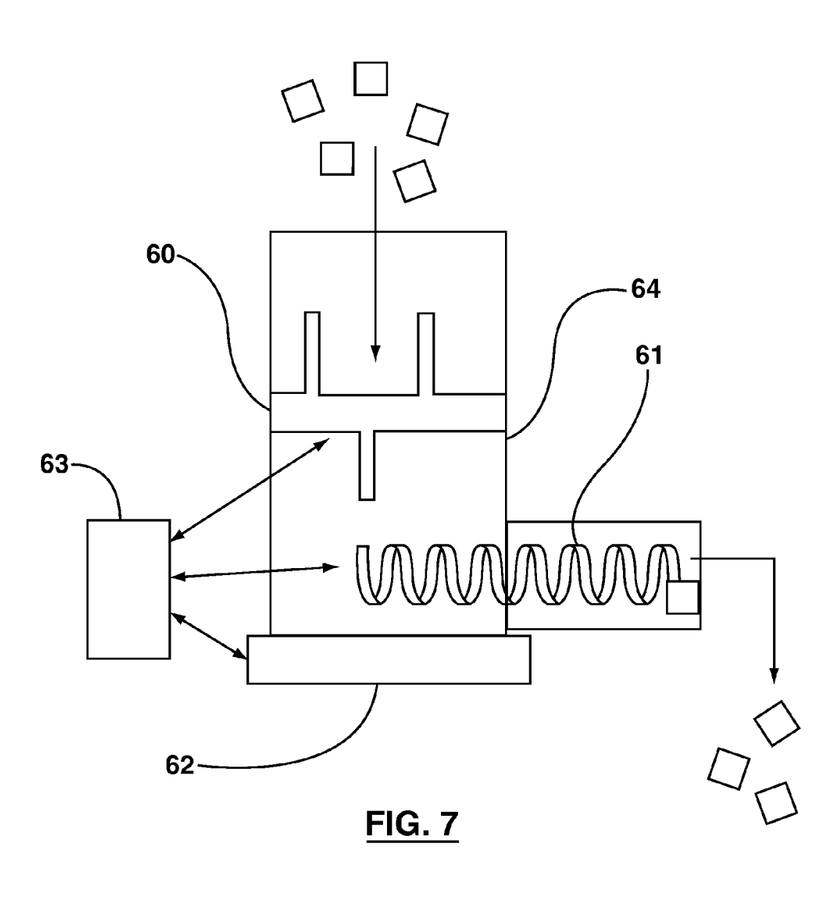
FIG. 7 illustrates an example loss-in-weight screw feeding system with rotor agitation.

FIG. 7 shows a side-view of a typical loss-in-weight screw feeder with essential components. Such a feeder is equipped with the described screw and tube 61 along with a hopper 64, and a load cell 62 connected to motor and system controls 63. In a loss-in-weight feeder, the feed rate is controlled using the load-cell and system controls to track the reduction in weight of the dense aggregates within the hopper. As the feed rates are typically controlled by screw speed, this allows for dynamically adjustable feed rates by constantly varying screw speed with the rate in weight reduction. When the hopper is at a low-level of aggregates remaining, the system is re-fed while the feeder temporarily runs in "volumetric mode".

Under certain circumstances, such as when using feeder hoppers with dimensions that are not favorable for material flow, an embodiment of the present invention may utilize a screw feeder with agitation. For the purpose of this invention, agitation is defined as a mechanism that continuously maintains the bulk of the dense aggregates within the feeder's hopper in motion. One example of agitation is a set of rotating "arms" 60, such as those shown in FIG. 6. It may be important to ensure that the agitation mechanism does not reduce density of the aggregates while they reside in the feeder's hopper. Other forms of agitation such as vibrating hopper walls may also be used.

Example 1

In order to produce dense fibre aggregates from a lignocellulosic pulp bale, a thermomechanical pulp bale with an approximate bale density of 0.8 g/cm$^3$, dimensions of 60 cm×80 cm×54 cm, and bone-dry moisture content under 15% was fed into a Q100 Low-Speed High-Torque Shredder manufactured by SSI Shredding Systems Inc., a company having its place of business in Wilsonville, Oreg., USA. The system was equipped with a 2-inch cutter and a 1.5-inch screen and was running at approximately 30 RPM. The Q100 system consists of 4 rotors and has a rated horsepower of 250-300 hp. Dense fibre aggregate production was performed without the optional hydraulic ram, and additional bales were continuously fed on top to maintain downward pressure. If bales were not fed to maintain continuous pressure, the bale currently being processed "floated" on top of the rotors once its weight had been reduced. The resulting dense fibre aggregates produced were of individual densities close to that of the original bale density, and had a bulk density of approximately 0.5 g/cm³.

Following production, the dense fibre aggregates were transferred without any change in their density into the extension hopper of a DSR-Series loss-in-weight screw feeder manufactured by Brabender Technologie, a company having its offices in Mississauga, Ontario, Canada. The screw feeder was equipped with a spiral screw and an agitation mechanism using a rotor within the hopper. The extension hopper selected for the feeder was rectangular and straight-walled to further minimize any bridging effect. The aggregates were fed without any bridging, and sufficiently filled the screw. Both batch and continuous feed modes were performed, and feed rates were achieved that matched the rated volumetric throughput of the feeder.

What is claimed is:

1. A method of preparing dense lignocellulosic fibre aggregates for use in manufacturing high performance, recyclable and moldable lignocellulosic fibre and thermoplastic composites, or articles made of the high performance, recyclable and moldable lignocellulosic fibre and thermoplastic composites, characterized in that said method comprises the steps of: a) obtaining a densified mass of lignocellulosic fibre; b) feeding the densified mass of lignocellulosic fibre into a size reduction device; and c) size reducing the densified mass of lignocellulosic fibre by means of the size reduction device so as to produce dense lignocellulosic fibre aggregates for use in manufacturing high performance, recyclable and moldable lignocellulosic fibre and thermoplastic composites, or articles made of the high performance, recyclable and moldable lignocellulosic fibre and thermoplastic composites, said dense lignocellulosic fibre aggregates having individual particle densities equal to or virtually equal to the densified mass of lignocellulosic fibre's density prior to being fed into the size reduction device.

2. The method of claim 1 characterized in that the dense fibre aggregates produced have a particle density approximately equal to the density of the densified mass of lignocellulosic fibre.

3. The method of claim 1 characterized in that the particle density of the lignocellulosic fibre is substantially maintained after size reduction for use in manufacturing high performance, recyclable and moldable lignocellulosic fibre and thermoplastic composites, or articles made of the high performance, recyclable and moldable lignocellulosic fibre and thermoplastic composites.

4. The method of claim 1 characterized in that it further comprises utilizing a size reduction device that includes at least one rotor.

5. The method of claim 4 characterized in that it further comprises the step of size reducing the densified mass of lignocellulosic fibre by bringing the densified mass of lignocellulosic fibre in densified form into contact with the at least one rotor.

6. The method of claim 4 characterized in that it further comprises the step of operating the size reduction device at low RPM and high torque.

7. The method of claim 1 characterized in that it further comprises the step of size reducing the densified mass of lignocellulosic fibre such that the dense fibre aggregates have a predetermined size.

8. The method of claim 1 characterized in that it further comprises the step of size reducing the densified mass of lignocellulosic fibre such that the dense fibre aggregates have a narrow particle size distribution and minimal degradation in fibre length.

9. The method of claim 1 characterized in that it further comprises the step of size reducing the densified mass of lignocellulosic fibre such that there is reduced bridging of the dense fibre aggregates.

10. The method of claim 1 characterized in that it further comprises the step of feeding the dense fibre aggregates into a manufacturing process at a predetermined mass flow rate to produce high performance, recyclable and moldable lignocellulosic fibre and thermoplastic composites, or articles made of the high performance, recyclable and moldable lignocellulosic fibre and thermoplastic composites.

11. The method of claim 10 characterized in that it further comprises the step of feeding the dense fibre aggregates at the predetermined mass flow rate into an extrusion, compounding, batch mixing, injection-molding, or it compounding and injection-molding apparatus for use in manufacturing lignocellulosic fibre and thermoplastic composites or products comprising lignocellulosic fibre and thermoplastic composites, whereby the dense fibre aggregates will experience minimal further reduction in density.

12. The method of claim 11 characterized in that it further comprises the step of utilizing a rotating screw device to feed the dense fibre aggregates into the manufacturing process apparatus.

13. The method of claim 12 characterized in that it further comprises the step of feeding the dense fibre aggregates into the manufacturing apparatus utilizing a loss-in-weight screw feeder.

14. The method of claim 10 characterized in that it further comprises the step of rotating the at least one rotor at a speed of between about 1 and 100 RPM.

15. The method of claim 1 characterized in that it further comprises the step of utilizing a low-speed high-torque shredder having at least one rotor as the size reduction device.

16. The method of claim 1 characterized in that it further comprises the step of utilizing a low-speed high-torque shredder having one or more rotors and a screen as the size reduction device.

17. The method of claim 13 characterized in that it further comprises the step of applying at least one spiral screw in the screw feeder.

18. The method of claim 17 characterized in that it further comprises the step of applying an agitation mechanism in the screw feeder.

19. The method of claim 1 characterized in that it further comprises the step of producing dense fibre aggregates having an approximate bulk density of between 0.1 and 1.6 g/cm.sup.3.

20. The method of claim 1 characterized in that it further comprises the step of producing the dense fibre aggregates having an average width of between 0.2 and 3 inches.

21. The method of claim 1 characterized in that the densified mass of lignocellulosic fibre consists of Kraft pulp.

22. The method of claim 1 characterized in that the densified mass of lignocellulosic fibre consists of High-Yield pulp.

23. The method of claim 1 characterized in that the densified mass of lignocellulosic fibre consists of agro-fibre pulp.

24. The method of claim 1 characterized in that the densified mass of lignocellulosic fibre has a bone dry moisture content of between 0 percent and 20 percent.

25. The method of claim 1 characterized in that it further comprises the step of utilizing the densified mass of lignocellulosic fibre having an approximate density of between 0.4 and 1.2 g/cm$^3$.

26. The method of claim 1 characterized in that it further comprises the step of applying lignocellulosic fibre and thermoplastic composite manufacturing processes consisting of one or more of following; extrusion; compounding; batch mixing injection-molding; and in-line compounding and injection-molding.

* * * * *

UNITED STATES PATENT AND TRADEMARK OFFICE
CERTIFICATE OF CORRECTION

PATENT NO. : 8,763,938 B2  Page 1 of 1
APPLICATION NO. : 12/863316
DATED : July 1, 2014
INVENTOR(S) : Vincent Yan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this
Twenty-ninth Day of September, 2015

Michelle K. Lee
*Director of the United States Patent and Trademark Office*